United States Patent [19]
Umholtz

[11] 3,739,474
[45] June 19, 1973

[54] POWER SKINNING KNIFE
[75] Inventor: Franklyn G. Umholtz, Shutesbury, Mass.
[73] Assignee: Russell Harrington Cutlery, Inc., Southbridge, Mass.
[22] Filed: Sept. 23, 1971
[21] Appl. No.: 183,154

[52] U.S. Cl. .................................. 30/215, 30/233
[51] Int. Cl. .................................... B26b 19/14
[58] Field of Search ................... 30/205, 206, 207, 30/215, 216, 218, 219, 220, 221, 222, 224, 347, 233

[56] References Cited
UNITED STATES PATENTS
2,547,134 4/1951 McLean ........................... 30/220 X
2,979,820 4/1961 Thompson .......................... 30/215
3,073,027 1/1963 O'Neilly ............................. 30/216

Primary Examiner—Robert C. Riordon
Assistant Examiner—J. C. Peters
Attorney—Charles R. Fay

[57] ABSTRACT

A power operated skinning knife of the type utilizing a pair of counter-oscillating circular toothed blades in close association, a frame for mounting said blades, a handle for the frame, said frame having a continuous external smooth surface which is rounded from adjacent the blades rearwardly towards the handle in two directions, and a cover for the frame and the blades, said cover member having a guiding surface on a generally concave curve in one direction and a convex curve in the transverse direction, this surface then merging into a flat unencumbered top surface.

1 Claim, 4 Drawing Figures

PATENTED JUN 19 1973  3,739,474
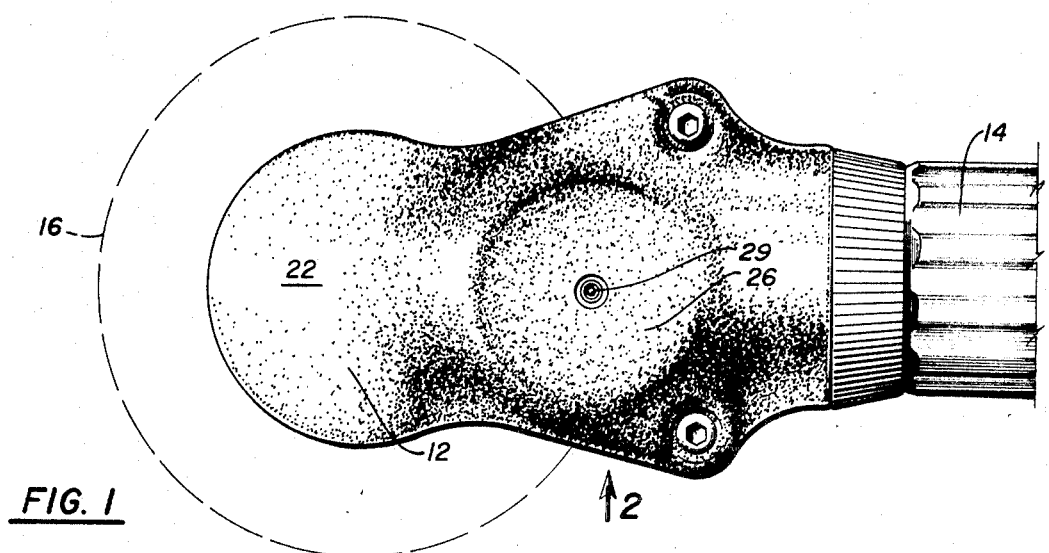
FIG. 1
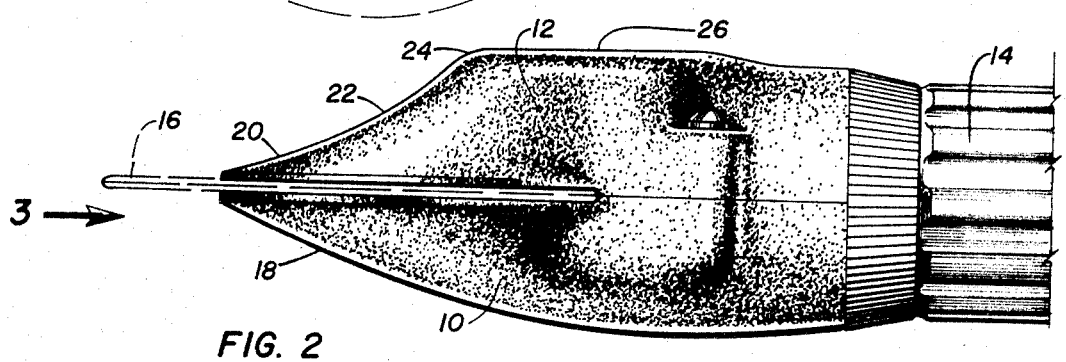
FIG. 2
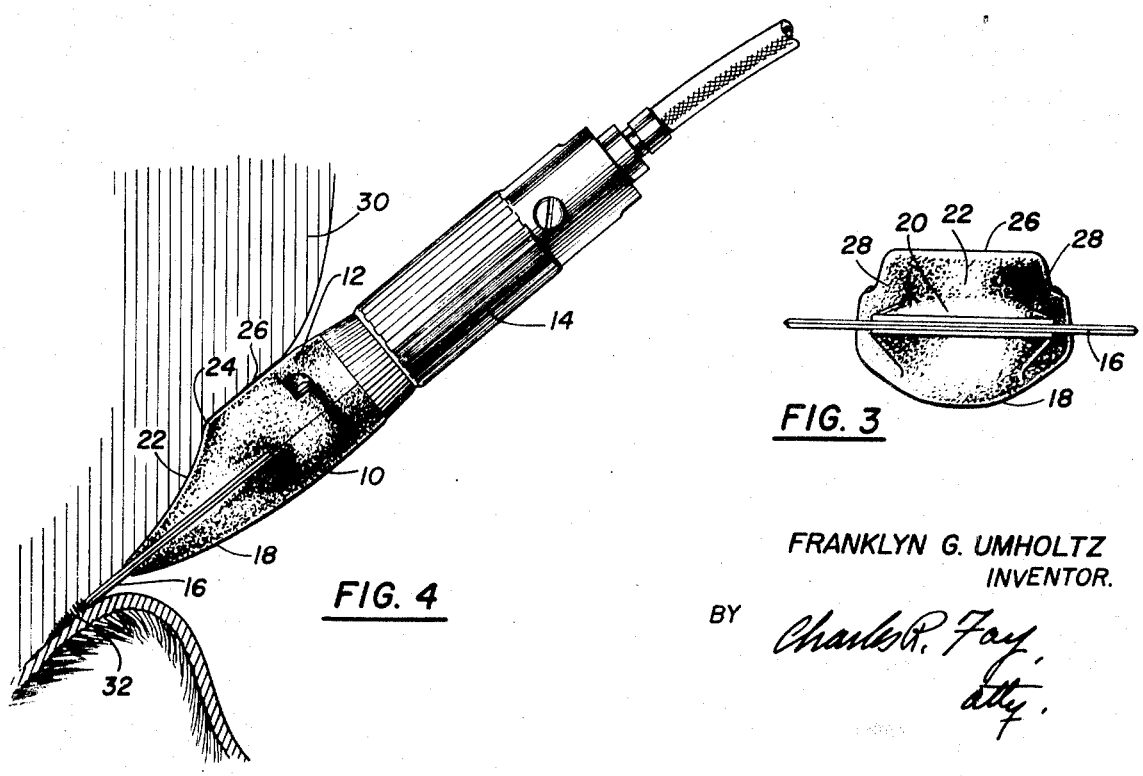
FIG. 3
FIG. 4
FRANKLYN G. UMHOLTZ
INVENTOR.
BY Charles R. Fay
  Atty.

POWER SKINNING KNIFE

BACKGROUND OF THE INVENTION

Hides are generally removed from carcasses by high speed toothed knives operated by air. The operators dehide the carcasses at a generally high rate of speed and often cut either the meat or the hide damaging them. The more cuts there are, the less the value of the hide and also of the meat, and it is therefore an object of the present invention to provide a dehiding or skinning knife which is easy for the operator to handle and which has a guide surface for guiding the blades with respect to the carcass, avoiding making cuts in either the leather or the meat.

SUMMARY OF THE INVENTION

A rotary skinning knife comprising a main frame and a cover, the main frame having a double curved surface which is convex in two directions although not equally so, together with a cover for covering the blades which are mounted on the main frame, the cover having a compound curved surface which is concave in one direction which is the direction of general motion of the blade against the carcass to dehide it, and a convex curve at right angles thereto, these curves merging gradually into a top flat area which is the main guiding surface for application of the tool to the carcass whereby the operator is enabled to easily guide the blades in the proper direction to skin the carcass without making cuts in either the meat or the hide.

BRIEF DESCRIPTION OF THE DRAWINGS

FIG. 1 is a top plan view of a skinning knife according to the present invention;

FIG. 2 is a view in side elevation thereof looking in the direction of arrow 2 in FIG. 1;

FIG. 3 is a front end view looking in the direction of arrow 4 in FIG. 2; and

FIG. 4 is a diagrammatic view illustrating the knife in use.

PREFERRED EMBODIMENT OF THE INVENTION

The apparatus comprises the main frame 10, a cover member 12, a handle 14, the blades being shown at 16. Although not shown herein, the main frame 10 mounts the blades as well as the mechanism for driving the same, and reference is hereby made to my copending application, Ser. No. 876,292, filed Nov. 13, 1969 now U.S. Pat. No. 3,624,902, for details concerning the knives and the gearing. The handle 14 is grasped by the operator to use the tool and it is conveniently provided with valve means for the air, etc., as is well known in the art and not here shown.

The main frame 10 as shown in FIGS. 2 and 3 is provided with a compound convex curve curvilinear continuous shape as generally indicated at 18. The cover 12 is secured thereto by any desired means such as bolts or screws and it is provided with a different shape from that of the main frame 10. This different shape is in general a kind of a duckbill shape looking down upon the tool as in FIG. 1; and as shown in FIG. 2 it rises slowly as at 20, along a concave curvilinear area at 22, merging gently on a convex curve at 24, into a flat guiding area 26 which is completely unobstructed. In the other direction, looking at FIG. 3, it will be seen that the transverse curvilinear shape of the cover is generally convex, see 28, 28. The reference character in FIG. 1 at 29 is an oiling hole.

In the use of the device, it is grasped by the handle in the usual manner and once started, the operator presses the concave curvilinear area 22 against the meat which is indicated at 30, cutting with the blades 16 through the integument or connective tissue between the hide and the meat, in general pressing the tool against the meat and indenting it somewhat by the shape of the cover curvature 24 and in the flat area 26. FIG. 4 illustrates his guiding action. In general therefore, the knife blades 16 are correctly positioned to slice through the connective tissue between the hide indicated at 32 and the meat 30 without cutting either one of them, or at least greatly lessening any possibility of cutting either the meat or the hide.

Some operators may prefer to reverse the knife thereby applying the guiding surfaces 22, 24, and 26 against the interior or flesh side of the hide, but in most cases it has been found that better results are normally obtained by utilizing the tool in the manner shown in FIG. 3.

I claim:

1. A power operated skinning knife of the type utilizing a circular blade and comprising a frame mounting the blade, a handle on the frame, said frame having a continuous, external, smooth convex surface extending gradually away from the blade outwardly with respect thereto, and a cover, said cover partially encompassing the blade, and including means for securing the cover with respect to the frame, said cover having a smooth, continuous, external concave surface which is rounded from a point adjacent the blade and rises outwardly away from the frame and from the blade, and terminating in a generally flat guide surface for the knife in the skinning operation, the convex frame surface and the concave cover surface being at opposite sides of the blade.

* * * * *